March 18, 1958     A. W. MARTIN     2,827,490
MESITYL OXIDE
Filed Oct. 26, 1955
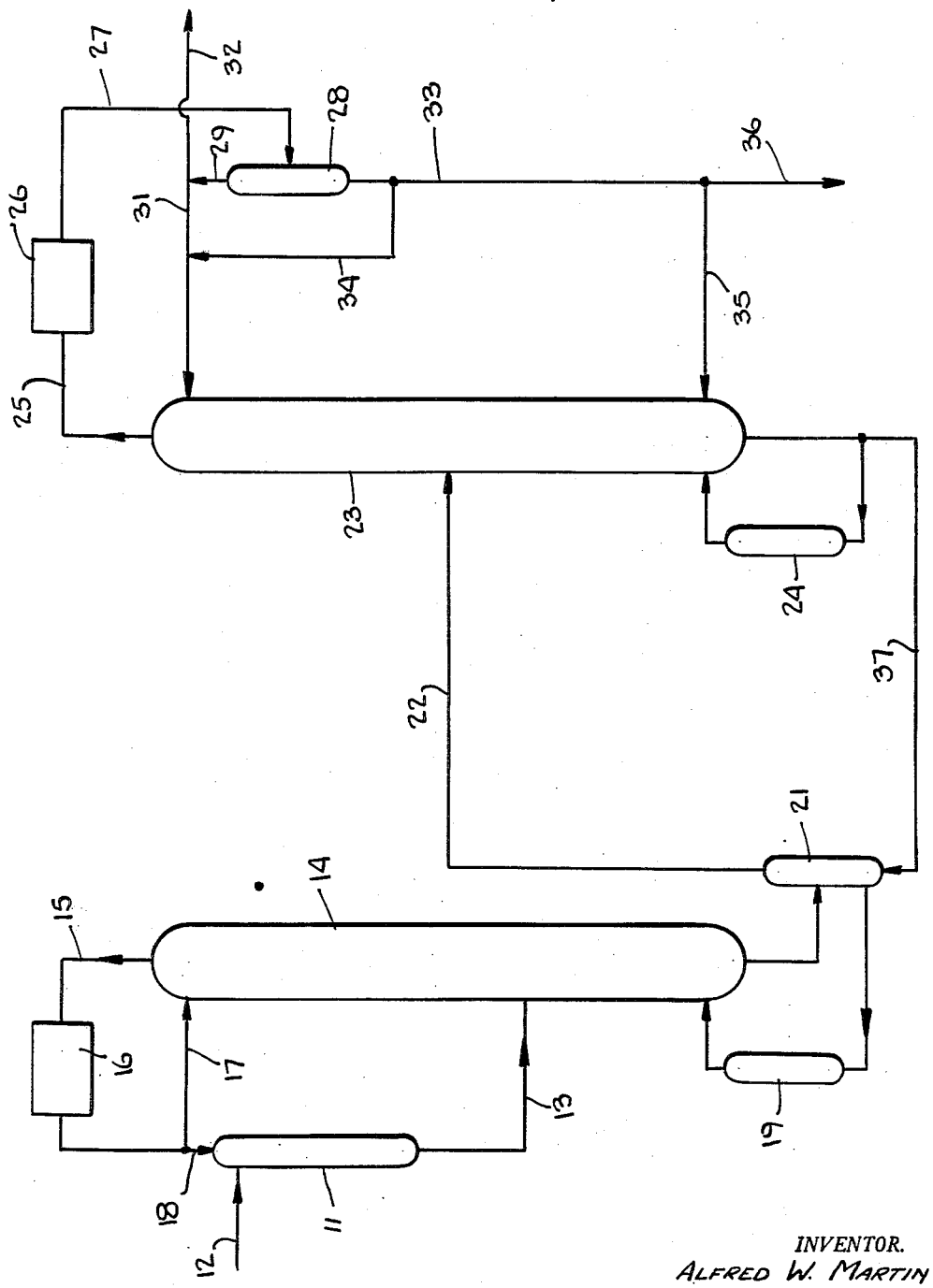
INVENTOR.
ALFRED W. MARTIN
BY
ATTORNEYS

United States Patent Office 2,827,490
Patented Mar. 18, 1958

2,827,490

MESITYL OXIDE

Alfred W. Martin, Corpus Christi, Tex., assignor to Celanese Corporation of America, New York, N. Y., a corporation of Delaware Application October 26, 1955, Serial No. 542,902

4 Claims. (Cl. 260—596)

This invention relates to mesityl oxide and relates more particularly to an improved process for the production of mesityl oxide from acetone.

An important object of this invention is to provide an improved process for the production of mesityl oxide from acetone which will operate in an economical, highly efficient manner.

A further object of this invention is to provide an improved process for the production of mesityl oxide from acetone according to which there will be obtained a good yield of highly purified product with a minimum of separation and purification steps.

Other objects of this invention will be apparent from the following detailed description and claims.

In carrying out the present invention, acetone is caused to undergo an aldol condensation to produce diacetone alcohol, according to the usual practice in the art. Thus, the acetone may be brought into contact with an alkaline catalyst, for example barium hydroxide on pumice or a mixture of lime, kieselguhr, sodium hydroxide and Portland cement at a temperature of between 60 and 120° F. for a period of between about 10 and 20 minutes. Although shorter reaction times could be used this would result in a lower conversion per pass of acetone to diacetone alcohol. There is obtained a product containing between about 5 and 10% by weight of diacetone alcohol, the rest being primarily acetone.

The reaction mixture is then entered into a first distillation column containing a dehydration catalyst. A suitable catalyst for this purpose is phosphoric acid. The amount of the dehydration catalyst should be sufficient to hold the pH of the liquid in the base of the column below 3 and preferably between 1 and 2. The distillation column is operated, under atmospheric pressure, at a base temperature of between 200 and 210° F. and a head temperature of between 132 and 134° F. In the distillation column, the major portion of the diacetone alcohol will be dehydrated to mesityl oxide. Simultaneously, the acetone present in the feed to the column, as well as any acetone formed through the decomposition of the diacetone alcohol, will be distilled overhead. A portion of this acetone may, advantageously, be returned to the column as reflux to give a reflux ratio of between 0.25 to 1 and 1 to 1, while the rest of the acetone is recycled to the aldol reaction. Advantageously, the concentration of water in this column should be below 2% by weight to avoid loss of the catalyst through solution.

The mesityl oxide that is formed by the dehydration of the diacetone alcohol accumulates in the base of the first distillation column, together with some diacetone alcohol, water and the dehydration catalyst. The mesityl oxide is insoluble in this mixture and separates out as an upper oil phase having dissolved therein some diacetone alcohol and water. The mesityl oxide-rich oil phase is then separated from the lower aqueous phase. A convenient method for carrying out such separation is to equip the first distillation column with a thermosiphon reboiler and to install in the reboiler circuit a decanter where the two phases will separate. However, other methods may also be used to effect the separation of the mesityl oxide phase.

The phase containing the mesityl oxide is then introduced into a second distillation column operated, under atmospheric pressure, at a base temperature of between 210 and 220° F., and at a head temperature of between 196 and 197° F. The second column also contains a dehydration catalyst which is preferably identical with the dehydration catalyst employed in the first distillation column. The concentration of the dehydration catalyst in the second column is preferably such as to hold the pH of the liquid in the base of the column below 3 and preferably between 1 and 2. In the second column, substantially all of the diacetone alcohol that is entered into said column with the mesityl oxide is dehydrated. The mesityl oxide distills overhead from said column in the form of its water azeotrope which, on condensation, separates into a lower aqueous phase containing less than one percent by weight of the mesityl oxide produced and an upper mesityl oxide phase containing less than one percent by weight of diacetone alcohol and less than one percent by weight of acetone, together with small amounts of water. Because of its high purity, the mesityl oxide phase may be withdrawn and used directly without further purification, for example, in the manufacture of methylisobutylketone or methylisobutylcarbinol by hydrogenation. This is in marked contrast to prior processes where the mesityl oxide obtained at the end of the dehydration reaction contained up to 20 percent by weight of acetone and had to be purified before it could be employed for such purposes. A portion of the lower aqueous phase and also of the mesityl oxide phase is returned to the second distillation column as reflux to give a reflux ratio of between 3 to 1 and 10 to 1. Another portion of the lower aqueous phase is recycled to the base of the distillation column to provide sufficient water to form the mesityl oxide-water azeotrope during the distillation. The rest of the lower aqueous phase is discarded. Because of its extremely small content of organic material, it is normally not necessary to treat the discarded portion to recover the organic material therefrom. However, if economic conditions warrant, such treatment may be readily effected.

In carrying out the process of this invention, the aqueous phase containing dehydration catalyst overflows from the first column and into the second column together with the mesityl oxide phase thereby building up the concentration of catalyst in the second column and reducing the concentration of dehydration catalyst in the first column below optimum levels. To maintain a substantially constant concentration of dehydration catalyst in both columns, there is recycled from the base of the second column to the base of the first column, a stream of dehydration catalyst.

The accompanying drawing is a diagrammatic flow sheet of the process of this invention.

Referring now to the drawing, the reference numeral 11 designates an aldol reactor, containing a suitable alkaline catalyst, into which a stream of acetone is entered through a conduit 12. The product from the aldol reactor 11 flows through a conduit 13 into an intermediate point of a first distillation column 14. The vapors coming overhead from the distillation column 14 pass through a conduit 15 into a condenser 16 where they are liquefied. A portion of the liquid is returned through the conduit 17 to the column 14 as reflux, while the rest of the liquid flows back to the aldol reactor 11 through the conduit 18.

At its base, the column 14 is equipped with a reboiler 19 and there is positioned in the reboiler circuit a decanter 21. The lower aqueous phase from the decanter 21 is returned to the column 14 through the reboiler 19, The upper oily phase is withdrawn from the decanter 21 through a conduit 22 and entered into an intermediate point of a second distillation column 23 equipped with a reboiler 24. The vapors coming overhead from the distillation column 23 pass through a conduit 25 into a condenser 26 wherein they are liquefied. The liquid so formed then flows through a conduit 27 into a decanter 28. The upper oily phase is withdrawn from the decanter 28 through a conduit 29 and a portion thereof is returned through the conduit 31 to the column 23 as reflux. The rest of the upper phase is withdrawn to a product receiver (not shown) through a conduit 32. The lower aqueous phase is withdrawn from the decanter 28 through a conduit 33. A portion thereof is recycled to the column 23 as reflux through a conduit 34. Another portion thereof is returned to the base of the column through a conduit 35 while the rest thereof flows to waste through a conduit 36. Dehydration catalyst solution is withdrawn from the base of the column 23 and flows to the base of the column 14 through a conduit 37.

The following example is given to illustrate this invention further:

*Example*

Employing the apparatus shown in the drawing, a stream of acetone containing 99.5% by weight of acetone and 0.4% by weight of water is entered at the rate of of 1.16 parts by weight per hour into the aldol reactor which is packed with a catalyst formed by reacting together lime, kieselguhr, sodium hydroxide and Portland cement in a manner well known in the art. The aldol reactor is maintained at a temperature of 85 to 95° F. by external heat and its volume is such that the acetone remains therein for a period of 15 mintues. The stream flowing from the aldol reactor contains 6% by weight of diacetone alcohol, the rest being acetone together with less than 1% by weight of water.

This stream is entered on the fifteenth tray from the base of a 24-tray distillation column operated at a head temperature of 132 to 133° F. and a base temperature of 205 to 210° F. Sufficient phosphoric acid (75 weight percent $H_3PO_4$) is introduced initially into the column to bring the pH of the liquid in the base thereof at 1.4 to 1.7. The vapors coming overhead are condensed and 18 parts by weight per hour of the liquid are returned to the column to give a reflux ratio of 1 to 1. The rest of the liquid is returned to the aldol reactor.

The mesityl oxide-rich oil phase from the decanter at the base of the first distillation column is entered on the fifteenth tray from the base of a 42-tray distillation column operated at a head temperature of 196 to 197° F. and a base temperature of 210 to 217° F. Sufficient phosphoric acid (75 weight percent $H_3PO_4$) is entered initially into the column to bring the pH of the liquid in the base thereof at 1.0 to 1.8. The vapors coming overhead are condensed and there is withdrawn from the decanter 1.0 part by weight per hour of mesityl oxide as product. The mesityl oxide phase contains 95.6% by weight of mesityl oxide, 0.7% by weight of acetone, 0.7% by weight of diacetone alcohol and 3.0% by weight of water. The column is operated at a reflux ratio (total of mesityl oxide phase and water phase) of between 6 to 1 and 10 to 1 to hold the temperature on the thirty-third tray from the base of the column at 198 to 200° F. Sufficient of the water phase from the decanter is returned to the base of the column to azeotrope all the mesityl oxide, while 0.155 part by weight per hour of the water phase are discarded. The water phase contains 0.1% by weight of acetone, 0.9% by weight of diacetone alcohol and 3.0% by weight of mesityl oxide. There are withdrawn from the base of the second column and returned to the first column 0.036 part by weight per hour of liquid to maintain the pH of the liquid in said columns between the ranges specified.

The efficiency of the process, based on the acetone charged, is 93.0% by weight. The efficiency loss owing to the discard of organic materials in the water layer is 1.7% by weight, based on the weight of the acetone charged.

It is to be understood that the foregoing detailed description is merely given by way of illustration and that many variations may be made therein without departing from the spirit of my invention.

Having described my invention, what I desire to secure by Letters Patent is:

1. A process for the production of mesityl oxide by the dehydration of diacetone alcohol, which comprises entering a mixture of acetone and diacetone alcohol into a distillation column containing a dehydration catalyst whereby the diacetone alcohol will be dehydrated to mesityl oxide which will accumulate in the lower portion of the column in a mixture in which the mesityl oxide is insoluble and from which it separates as an oil phase containing some diacetone alcohol, distilling acetone overhead from said column, physically separating the oil phase from the mixture in the lower portion of the colum, entering said oil phase into a second distillation column containing a dehydration catalyst whereby the diacetone alcohol in said oil phase will be dehydrated to mesityl oxide, distilling mesityl oxide overhead from said column as a mesityl oxide-water azeotrope, liquefying said azeotrope whereby it separates into a mesityl oxide phase and an aqueous phase, and separating the mesityl oxide phase.

2. A process for the production of mesityl oxide by the dehydration of diacetone alcohol, which comprises entering a mixture of acetone and diacetone alcohol into a distillation column containing a dehydration catalyst whereby the diacetone alcohol will be dehydrated to mesityl oxide which will accumulate in the lower portion of the column in a mixture in which the mesityl oxide is insoluble and from which it separates as an oil phase containing some diacetone alcohol and dehydration catalyst, distilling acetone overhead from said column, physically separating the oil phase from the mixture in the lower portion of the column, entering said oil phase into a second distillation column containing a dehydration catalyst whereby the diacetone alcohol in said oil phase will be dehydrated to mesityl oxide, distilling mesityl oxide overhead from said column as a mesityl oxide-water azeotrope, liquefying said azeotrope whereby it separates into a mesityl oxide phase and an aqueous phase, separating the mesityl oxide phase, and recycling dehydration catalyst from the lower portion of the second column to the first column.

3. A process for the production of mesityl oxide by the dehydration of diacetone alcohol, which comprises entering a mixture of acetone and diacetone alcohol into a distillation column containing a dehydration catalyst whereby the diacetone alcohol will be dehydrated to mesityl oxide which will accumulate in the lower portion of the column in a mixture in which the mesityl oxide is insoluble and from which it separates as an oil phase containing some diacetone alcohol and dehydration catalyst, distilling acetone overhead from said column, physically separating the oil phase from the mixture in the lower portion of the column, entering said oil phase into a second distillation column containing a dehydration catalyst whereby the diacetone alcohol in said oil phase will be dehydrated to mesityl oxide, distilling mesityl oxide overhead from said column as a mesityl oxide-water azeotrope, liquefying said azeotrope whereby it separates into a mesityl oxide phase and an aqueous phase, separating the mesityl oxide phase, recycling sufficient water from the aqueous phase to the second distillation column to azeotrope all the mesityl oxide, and recycling dehydration catalyst from the lower portion of the second column to the first column.

4. A process for the production of mesityl oxide by the dehydration of diacetone alcohol, which comprises entering a mixture of acetone and diacetone alcohol into a distillation column containing a dehydration catalyst in an amount sufficient to bring the pH of the liquid in the lower portion of the column below 3 whereby the diacetone alcohol will be dehydrated to mesityl oxide which will accumulate in the lower portion of the column in a mixture in which the mesityl oxide is insoluble and from which it separates as an oil phase containing some diacetone alcohol and dehydration catalyst, distilling acetone overhead from said column, physically separating the oil phase from the mixture in the lower portion of the column, entering said oil phase into a second distillation column containing a dehydration catalyst in an amount sufficient to bring the pH of the liquid in the lower portion of the column below 3 whereby the diacetone alcohol in said oil phase will be dehydrated to mesityl oxide, distilling mesityl oxide overhead from said column as a mesityl oxide-water azeotrope, liquefying said azeotrope whereby it separates into a mesityl oxide phase and aqueous phase, separating the mesityl oxide phase, recycling sufficient water from the aqueous phase to the second distillation column to azeotrope all the mesityl oxide, and recycling dehydration catalyst from the lower portion of the second column to the first column.

References Cited in the file of this patent

FOREIGN PATENTS 383,474  Great Britain _____ Nov. 17, 1932